United States Patent [19]
James

[11] Patent Number: 6,087,802
[45] Date of Patent: *Jul. 11, 2000

[54] LIGHTWEIGHT, COMPACT, ON-BOARD ELECTRIC VEHICLE BATTERY CHARGER

[76] Inventor: Ellen James, 768 Brittain La., Santa Rosa, Calif. 55407

[*] Notice: This patent issued on a continued prosecution application filed under 37 CFR 1.53(d), and is subject to the twenty year patent term provisions of 35 U.S.C. 154(a)(2).

[21] Appl. No.: 08/518,638

[22] Filed: Aug. 24, 1995

[51] Int. Cl.$^7$ .................................. G05F 1/40; H02J 7/00
[52] U.S. Cl. ............................. 320/104; 323/266; 363/89
[58] Field of Search .......................... 320/2, 104; 323/266; 363/89, 124, 26

[56] References Cited

U.S. PATENT DOCUMENTS

| | | | |
|---|---|---|---|
| 4,002,963 | 1/1977 | Hunter | 321/18 |
| 4,656,570 | 4/1987 | Swoboda | 363/26 |
| 5,350,994 | 9/1994 | Kinoshita et al. | 320/15 |
| 5,461,301 | 10/1995 | Truong | 363/26 X |
| 5,581,171 | 12/1996 | Kerfoot et al. | 320/50 |
| 5,594,632 | 1/1997 | Barrett | 363/44 |

OTHER PUBLICATIONS

Vaughn E. Border, Vice President, Marketing, Lester Electrical, Letter regarding product description concerning their EV Chargers, dated Aug. 9, 1995.

Jerry Weekley, Japlar Monarch Company, Letter regarding their 2.4 KW charger and their 7.2 KW model, dated Aug. 8, 1995.

PG&E study from R&D Department, titled, "Testing of Inductive and Conductive Electric Vehicle", pp. 6–15. Apr. 1994.

EV America, Requests for Proposals, Prepared by The Electric Vehicle Market Development Group, Apr. 17, 1995.

Prepared by John Mead, PG&E's Research and Development Study on "The Impact of Electric Vehicle Battery Charging on the PG&E Distribution System", Apr. 1994.

Institute of Electrical and Electronics Engineers, Inc., "IEEE Recommended Practices and Requirements for Harmonic Control in Electrical Power Systems", Apr. 12, 1993 (IEEE Std 519–1992) pp. 7–100.

*Primary Examiner*—Peter S. Wong
*Assistant Examiner*—Gregory J. Toatley, Jr.
*Attorney, Agent, or Firm*—Robert D. Fish; Fish & Associates, LLP

[57] ABSTRACT

An onboard electric vehicle charger is provided which incorporates a forward converter with dynamic balancing of the primary drive currents of its ferrite core transformer to produce 5,000 watt charging power with a power density of 333 watts per kilogram and full safety isolation between the input power source and the batteries plus small size (approximately 15" by 9" by 6") and weight (less than 15 kilograms) and a power factor correcting boost preregulator with dynamic adjustment of its compensation networks which produces full correction to substantially unity (99.9+ %) for power factor with current total haromonic distortion (THD) of 2% to 3% over the entire power range of 100 watts to 5,000 watts. The same boost preregulator circuit allows operation from power sources of 95 to 145 VAC or 200 to 275 VAC. The combination of the boost converter, (boost preregulator) and forward converters with the invention's control scheme enables constant throughput (in watts) during each step of the charging process and a constant pulse width modulation (PWM) duty cycle near maximum at all power levels by varying the output voltage of the boost preregulator in direct relation to the power level. A second forward converter, using the same dynamic balancing of primary currents utilized in the main forward converter described, works with the boost preregulator described to permit integration of a DC to DC converter function with 1 KW (75 A @ 14 VDC) capability plus full safety isolation between the high voltage propulsion batteries and the auxiliary (12 volt) electrical system of the vehicle.

1 Claim, 5 Drawing Sheets

LIGHTWEIGHT, COMPACT, ON-BOARD ELECTRIC VEHICLE BATTERY CHARGER

TECHNICAL FIELD

This invention relates generally to battery chargers, and in particular, this invention relates to a lightweight, onboard, isolated, electric vehicle battery charger which corrects for power factor and can be constructed to include a built-in DC to DC Converter.

BACKGROUND OF THE INVENTION

Electric vehicles include battery packs which supply the electricity for their motors. These battery packs require frequent charging. The longest range which such vehicles have achieved with available battery packs is approximately 80 miles. One method however of recharging batteries is through stations with large, stationary chargers. This method ties vehicle owners to a relatively small geographic area near an available charging station. The better solution is to utilize an onboard charger so that the vehicle's battery pack can be charged wherever there is an electric outlet.

Onboard battery chargers require solutions to specific problems before they achieve practicality. The first problem is safety. Unless the battery charger isolates the power source from the battery pack, there is an unacceptable risk of fatal electric shock during charging. Chargers which do not include such isolation cannot be integrated into vehicles or utilized for any other purposes by the public.

The engineering solution must result in sufficient isolation for safety, while providing adequate charging power to charge vehicle battery packs quickly and at the same time keep charger size and weight to a minimum. The ratio of charging power to charger weight is known as "power density."

The second problem is correction for power factor and total harmonic distortion (THD). Power factor must be corrected to prevent large amounts of power which do not register on electric meters from being converted into second third, fifth and higher order haromonics which reflect back into the power grid causing large amounts of THD. See PG&E, *The Impact of Electric Vehicle Battery Charging on the PG&E Distribution System*, 1994.

Third, sixth, ninth, etc. harmonics heat neutral conductors in wiring and electrical panels, and the primary windings of utility pole or vault transformers and, over time, damage this costly equipment. Second, fifth, eighth etc. harmonics cause counter-rotating magnetic fields in electric motors so they draw more power to do less work, again leading eventually to costly equipment failures.

The power factor/THD problem therefore is a major, emerging priority for utility companies. The International Electrical and Electronic Engineers (IEEE) are currently discussing standards which will be mandated for all equipment which uses the power grid. See *IEEE Proposed Standard* 519. With thousands of electric vehicles anticipated by the end of this decade, imposition of this standard will require substantial improvement in power factor correction and THD for electric vehicle battery chargers.

A third problem is that constant current control schemes lead to rising power throughput, especially during the initial bulk charge step, during which most of the total charge energy is returned to the batteries. As a result power throughput reaches 100% of the charger's capability only in the last moment before bulk charge termination, and charging time is much longer than with constant power throughput as achieved in this invention.

The optimum number of charging steps varies with each battery management scheme chosen by each manufacturer. Usually these consist of several bulk charge steps followed by several equalization steps. The problem that must be addressed is to provide a sufficient number of programmable steps with programmable power levels to satisfy the charge algorithms of each battery manufacturer.

A fourth problem is the charge termination criterion used by a charger, that is, how a charger decides when to terminate each step of the charging process, and when to start each step. Most chargers use voltage leveling detection. This method is not as precise and is therefore inferior to "temperature compensated absolute voltage threshold detection." Absolute voltage threshold detection uses a temperature compensated absolute voltage reference so that the correct voltage threshold can be precisely established for charge termination. This is very important because the correct voltage to which a battery should be charged varies with the temperature of the battery.

A fifth problem is compatibility of the charger with the different voltages required for specific battery packs. Most chargers are designed to charge at a specific voltage level and cannot be used for charging when a battery pack with a different voltage level is installed.

Sixth and finally, electric vehicles require converters so that their high-voltage battery pack can be utilized to power the peripheral electrical systems of the vehicle, such as the radio, the cooling system and the windows. Vehicle manufacturers currently incorporate a separate DC to DC converter into their vehicles which adds an increment of cost to the vehicle's manufacture.

DESCRIPTION OF PRIOR ART

First, other small, lightweight chargers, even though they may be usable in terms of size or offer isolation between the battery pack and the input power source, lack the charging capacity or weigh considerably more than the charger achieved with the present invention. For example, Lester Electrical's 2.5 KVA chargers weigh 43.18 Kg and have a power density of 58 watts per kilogram. American Monarch's 2 KVA chargers weigh 22 Kg and have a power density of 90 watts per kilogram. American Monarch's 7.2 KVA charger weighs 54 kilograms and has a power density of 132 watts per kilogram. Applicant's invention produces 5 KVA in throughput and weighs 15 kilograms, producing a power density of 333 watts per kilogram, an improvement in power density of nearly three times.

Weight is a critical consideration for electric vehicles which must include large heavy battery packs and are limited to low horsepower motors in order to achieve adequate cruising range. Because low horsepower ratings are needed to achieve a practical range, small increments of extra weight can have a material impact on vehicle speed and range. This invention weighs less than 15 kilograms, substantially less than any other onboard charger currently available.

Second, because correction for power factor and THD is of increasing importance, this invention contains circuitry which corrects power factor fully (99.9+%) and reduces THD to between 2% and 3%, meeting the requirements of IEEE Proposed Standard 519, and the standards (5% max. for THD) set by EV America, explained below.

Many electric chargers small enough to mount on board vehicles offer no power factor correction (for instance the Soleq 2400 and the ZIVAN chargers). Both Lester Electric's chargers and American Monarch's chargers are also in this category. All these non-corrected chargers have power factors of 65% to 75% and THD figures between 90% and 105%. These are all grossly unacceptable to the utility companies and will not meet the standards of IEEE Proposed Standard 519, or the standards set by EV America.

The Hughes onboard charger includes a power factor correction circuit which corrects power factor to 89.3% and produces THD of 19.5%, still far short of performance achieved using this invention and the standards of the IEEE. The Hughes power factor correction circuitry is also static in design and unlike this invention cannot optimally correct for power factor and THD at all power levels, resulting in periods of even higher power loss and higher THD.

Third, no other compact, lightweight charger, including those cited above, can charge from 120 VAC, 208 VAC, 240 VAC, or from any other voltage between 200 VAC and 275 VAC, or between 95 VAC and 145 VAC. Each such charger cited, other than this invention, must be custom designed to accommodate different input voltages, while this invention automatically adjusts to whatever input voltage level is supplied.

Fourth, no other compact, lightweight charger includes a boost preregulator circuit which combines with a forward converter in such a way as to produce constant throughput during each bulk charge period. For instance, Lester Electrical and Monarch's chargers in this category both start at 75%, and achieve 100% of their capability only momentarily at completion of charging. An additional benefit of this combination of boost preregulator and forward converter according to the present invention is that it allows any combination of input and output voltages. With a boost regulator alone, as in the Hughes onboard charger, the input voltage must always be less than the battery voltage, a serious limitation.

Also without the forward converter included in this invention, no isolation exists between the power source and the battery pack. This causes serious problems when operating from GFI circuits which have been mandated by standards set by EV America. See EV America, *Request for Proposals,* Apr. 17, 1995. EV America is a consortium of utilities that is setting standards for federal agency purchases of electric vehicles and is otherwise establishing safety and engineering standards for the industry.

SUMMARY OF THE INVENTION

According to the present invention, a compact lightweight, electric battery charger is provided for use onboard both on and off road electric vehicles. This charger possesses the following features which exist in this combination in no other onboard charger: (1) A forward converter with dynamic balancing of the primary drive currents of a 3 inch ferrite core transforomer which produces 5,000 watt charging power with a power density of 333 watts per kiloogram and full safety isolation between the input power source and the batteries. As a result the invention is also small in size (approximately 15" by 9" by 6") and weight (less than 15 kilograms). (2) A power factor correcting boost preregulator with dynamic adjustment of its compensation networks to produce full power factor correction to unity (99.9+%) with current total harmonic distortion (THD) of 2% to 3% over the entire power range of 100 watts to 5,000 watts. (3) The same boost preregulator circuit allows operation from power sources of 95 VAC to 145 VAC or 200 VAC to 275 VAC. (4) The combination of the boost preregulator and forward converter with the invention's new control scheme produces additional benefits, including constant throughput (in watts) during each step of the charging process, the ability to keep the pulse width modulation (PWM) duty cycle of the forward converter constant and near maximum at all power levels by varying the output voltage of the preregulator in direct relation to the power level. This keeps the efficiency of the forward converter as high as possible at all power levels. (5) Optionally, a second forward converter, using the same dynamic balancing of primary currents utilized in the main forward converter described in (1) above, works with the preregulator described in (2) above, to permit integration of a DC to DC converter with 1 KW (75A @14 VDC) capability plus full safety isolation between the high voltage propulsion batteries and the vehicle's auxiliary (12 volt) electrical system.

The charger of the present invention can operate at either 50 or 60 Hertz, and no neutral conductor is used for operation from 200 VAC TO 275 VAC, assuring complete compatibility with all European and Japanese power systems.

DETAILED DESCRIPTION OF THE INVENTION

Electric battery chargers are connected to a power source. The power source connection of this invention is either single or three phase (1), consisting of a grounding plug connected to a multi-conductor power cord which will vary according to the voltage desired.

All three versions of the cord connect to twist-lok connector bodies which mate with a flanged inlet (2), NEMA #L21-30, mounted at an appropriate location on the vehicle. Each version of the power cord makes the connections necessary to cause the charger to operate collectly at that specific voltage range. For operation from 95 VAC to 145 VAC, connection is made to terminals G,W, and X of the flanged inlet. For operation from 200 VAC to 275 VAC single phase, connection is made to terminals G. X and Y. For operation from 200 VAC to 275 VAC three phase, connection is made to terminals G, X, Y, and Z.

Figure 1:
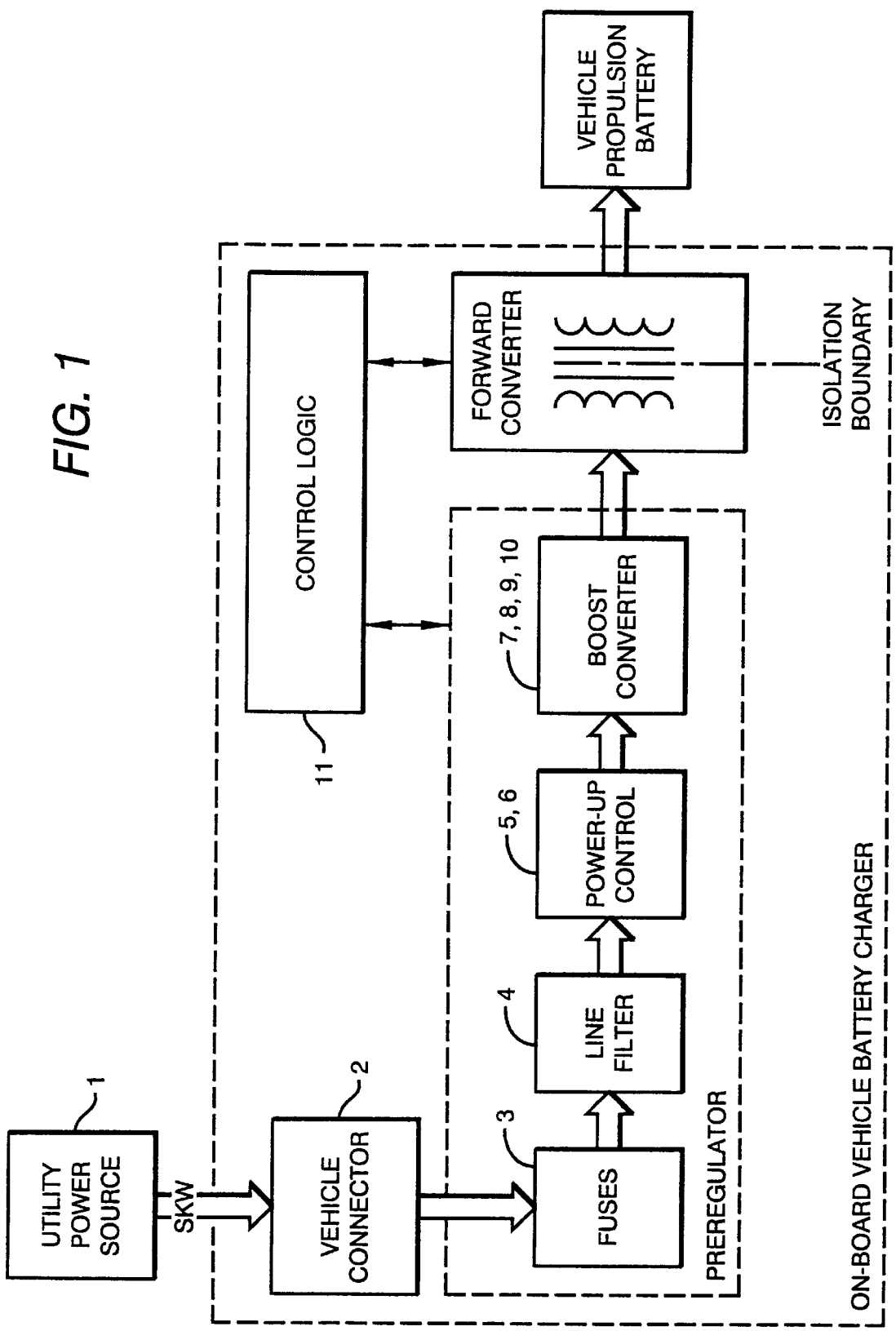
FIG. 1 is a "block diagram" overview of the entire on-board charging system, according to a preferred embodiment of the invention.

FIG. 1 describes the boost preregulator circuit. Depending on whether the source is single or three phase, from the flanged inlet (2) the power passes into this circuit through either two or three Cooper-Bussman FWA-40 40 Amp/150 VAC semiconductor fuses (3). From the fuses the power passes through a filter circuit (4), composed of an inductor and a capacitor in each power leg to insure compliance with pending FCC regulations to limit radio frequency interference from domestic appliances. The exact sizes and types of inductors and capacitors used in the filter circuit will depend upon the specifications called for in such final FCC regulations. Although this filter circuit is not in the prototype unit, it was allowed for in the design of the charger, so that it can be incorporated into the charger at such time as FCC regulations are passed.

Power then passes to either two or three TECCOR Q6Ø4ØP power triacs (5) which are controlled by the power-up sequence logic (6). (There are two fuses and two power triacs in the single phase version of the charger, and three fuses and three power triacs in the three phase version.) The power-up sequence logic provides one second of dead time after application of power to the circuit to prevent any spark from occurring while connecting the cord to the vehicle. After the one second of dead time, a trickle charge period of ten to twelve seconds occurs in order to trickle charge the bulk capacitors, preventing a large power surge that would blow the input fuses and damage the charger. The power-up sequence logic (6) is composed of an LM556 dual timer and a 74C107 dual R-S, J-K, master-slave flip-flop. At the end of the trickle charge period, the power triacs (5) are energized, providing the main power path into the charger.

From the triacs the power passes through a Powerex MEB00806 three-phase bridge rectifier (7) where it is rectified. The output of the bridge rectifier then feeds the input inductor (8) which consists of a Micrometals T300-26D three-inch, toroidal, powdered iron core wrapped with 80 turns of two sets of conductors, each set composed of seven twisted insulated 20 gauge copper conductors, with the sets bifilar wound and connected in parallel. Power then passes to a Powerex CM50E3Y-12E 50 amp, 600 volt insulated-gate bipolar transistor (IGBT) (9) with an internal, matched boost diode, then to a pair of 4,700 UF, 450 volt electrolytic bulk capacitors (10).

The IGBT is controlled by a high power-factor boost preregulator controller circuit (11) which uses an integrated circuit (IC) manufactured by Unitrode Integrated Circuits Corp. of Merrimack, N.H., Part No. UC1854. This controller operates by micro-managing the input current so that it is continuous and in phase with the input voltage resulting in substantially full unity power factor (99.9+%) and low THD) (2% to 3%).

Figure 2:
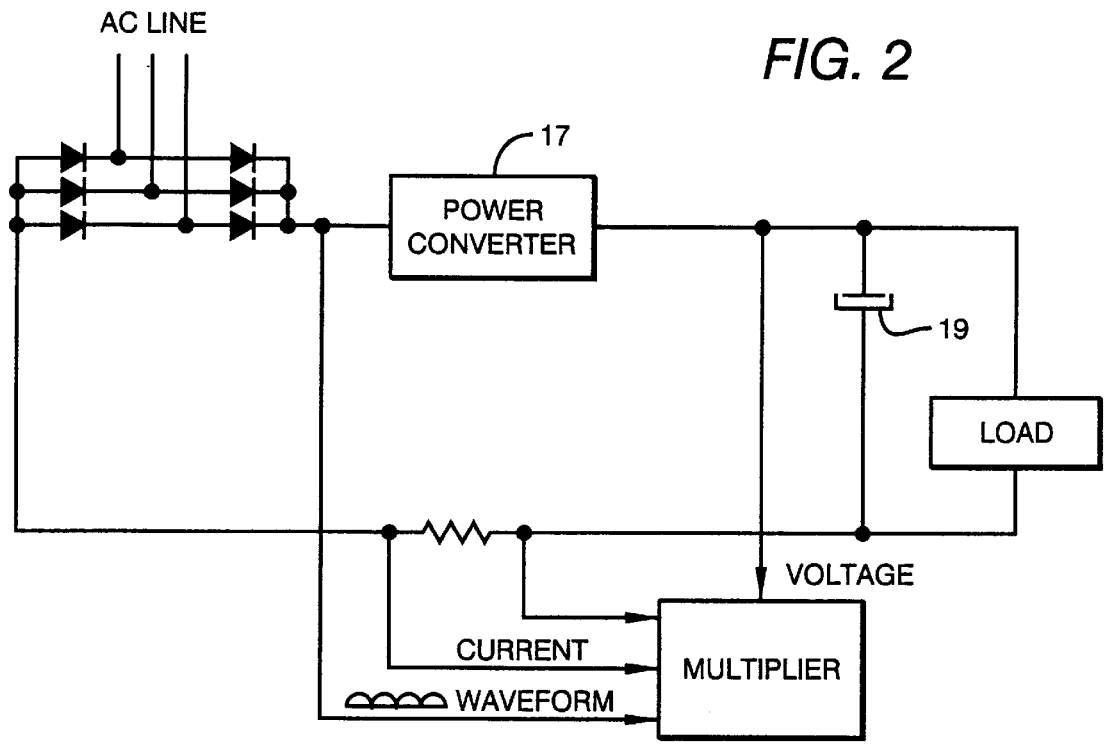
FIG. 2 is a circuit diagram for the high power factor boost preregulator.

FIG. 2 is a diagram of the high power factor boost preregulator controller circuit utilizing the Unitrode UC1854 IC to provide active power factor correction for power systems that otherwise would draw non-sinusoidal current from sinusoidal power lines producing low power factor and undesirably high THD.

The objective of this feature of the invention is full power factor correction at all power levels from the lowest power level possibly needed up to the maximum power level of 5,000 watts (in future models up to 10,000 watts). To achieve this objective, frequency compensation of the gain/bandwidth product of both the current control loop and the voltage control loop is required. Since the charger will cycle through a charging algorithm with varying current outputs the frequency compensation must be itself compensated for power level by dynamically switching the values of the components in the compensation network of the voltage control loop with each step of the charging algorithm.

The number of steps varies with the specific battery charging algorithm. A battery charging algorithm is the number of steps required, the voltage thresholds used, and the charging current at each step, which is optimum for charging a given battery. The algorithm for a specific battery is usually specified by the battery manufacturer. According to the presently preferred embodiment, up to nine discrete steps are programmable in the charging algorithm, which is based on an algorithm reported in Chan, C. C., Leung, W. S., Chu, K. C., "A Microprocessor Based Intelligent Battery Charger for Electric Vehicle lead Acid Batteries," published in the *Proceedings of the* 1989 *Electric Vehicle Symposium Hong Kong*. This is more than adequate to meet the foreseeable needs of the various battery manufacturers. However, other charging algorithms may be used in the present invention without deviation from the scope of the claims below.

Figure 4:
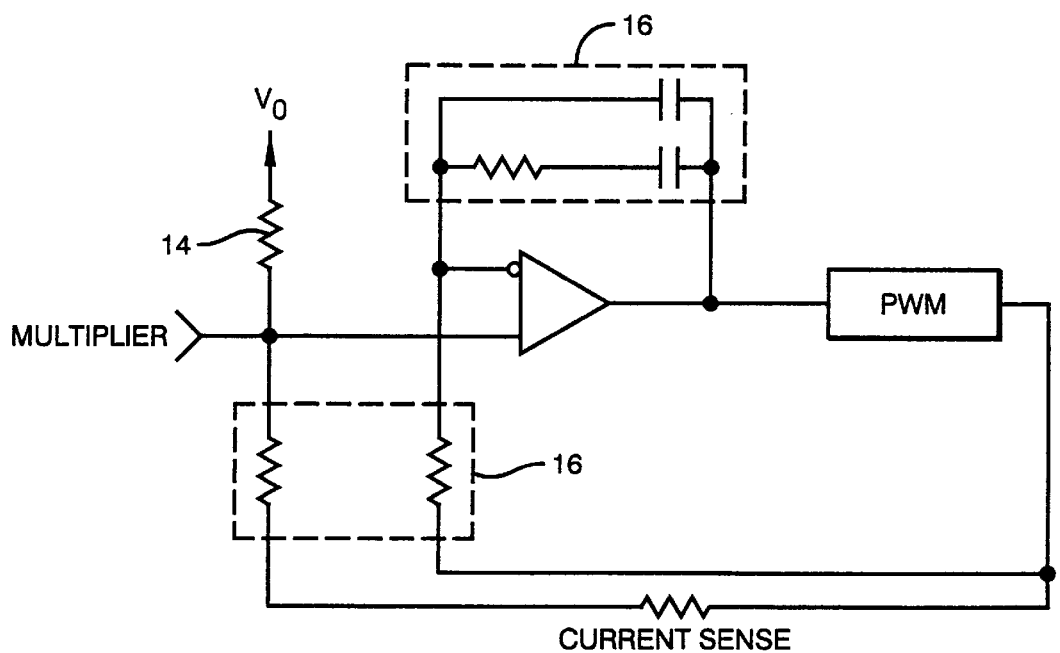
FIG. 4 is a circuit diagram for the current amplifier input and feedback networks.
Figure 3:
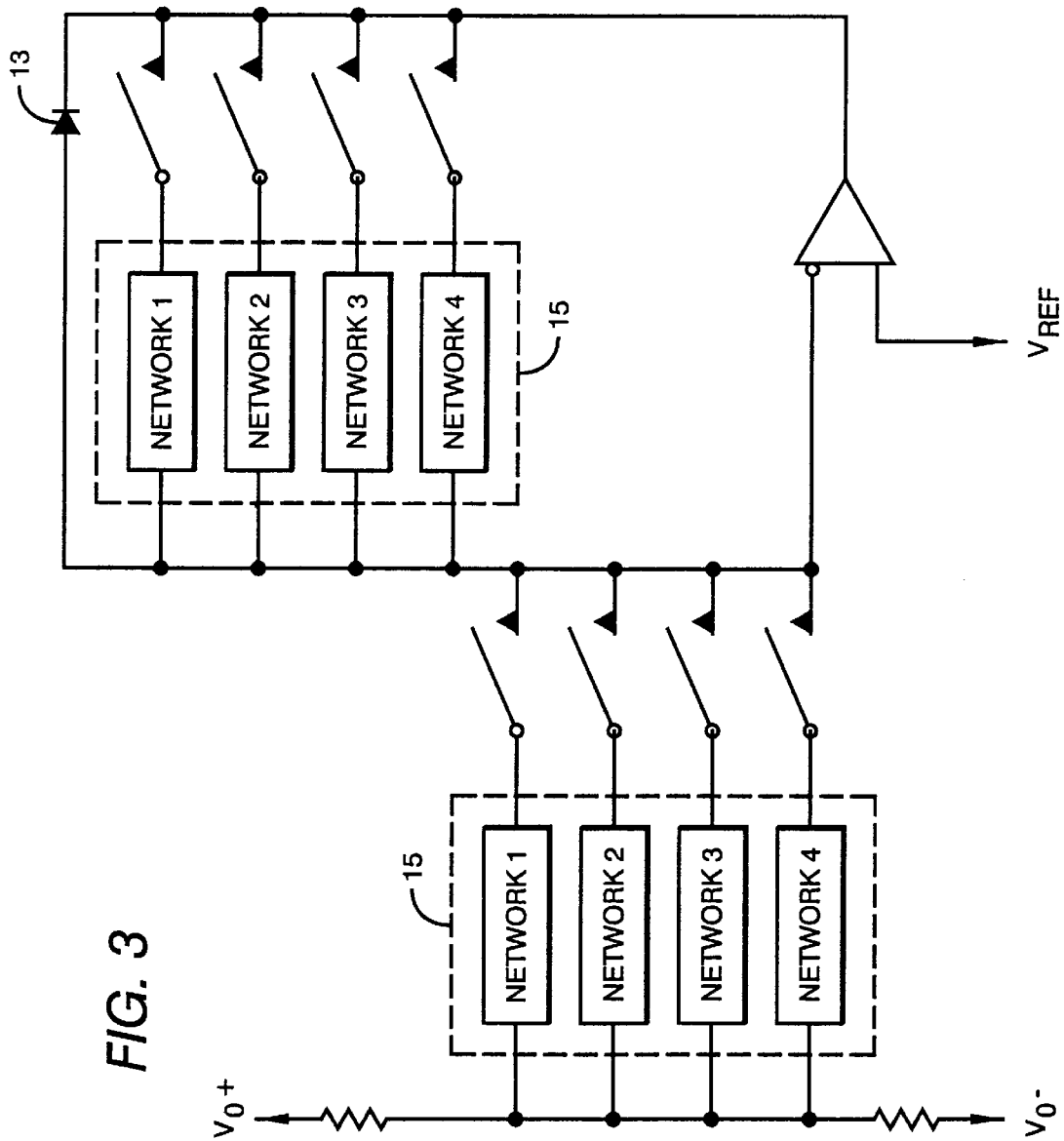
FIG. 3 is a circuit diagram for the voltage amplifier input and feedback networks.

FIG. 3 shows the voltage input and feedback networks (15). FIG. 4 shows the current input and feedback networks (16).

The input networks and the compensation networks utilized for the IC chosen for this power factor boost preregulator circuit consist of resistors, capacitors and diodes. A diode (13) was added to provide clamping of the voltage compensation circuit, limiting compensation to a maximum level. A resistor (14) was added to correct for offset voltage cancellation of the current amplifier. Also, since the manufacturer's applications example was for a 250 watt boost converter, modifications were made to the compensation formulas supplied by the manufacturer of the Unitrode UC 1854 IC to increase the degree of phase shift introduced by the compensation network, from the formulas specified by the IC manufacturer, to higher levels (in other words, by altering the value of the resistor and the capacitor in the compensation network). These modifications resulted in substantially unity (99.9+%) power factor, and a further, significant reduction of THD to and below the levels predicted to be possible by the manufacturer of the IC. For the power range of 1500 to 5000 watts, the optimum effective values were found to be 50K for the resistor, and 56 NF for the capacitor.

The output of the controller IC drives a Powerex M57959L IGBT driver IC. This provides the bipolar gate drive necessary for safe operation of the IGBT at this power level in the preregulator (17 on FIG. 2). The IGBT driver contains controlled shutdown fault detection circuitry to protect the IGBT under short-circuit load conditions.

From the bulk capacitor (19 on FIG. 2) of the boost preregulator, power passes through a Cooper-Bussman FWH-25 25 Amp/500 VDC semiconductor fuse to the forward converter. At this point in the circuit the voltage supplied to the primary side of the forward converter is being held constant by the boost preregulator circuit. The primary current in the forward converter also is held constant by the primary side control scheme used. The result is constant throughput (watts) so that the charger operates at 100% of its design capability throughout the initial step of the charging process.

Figure 5:
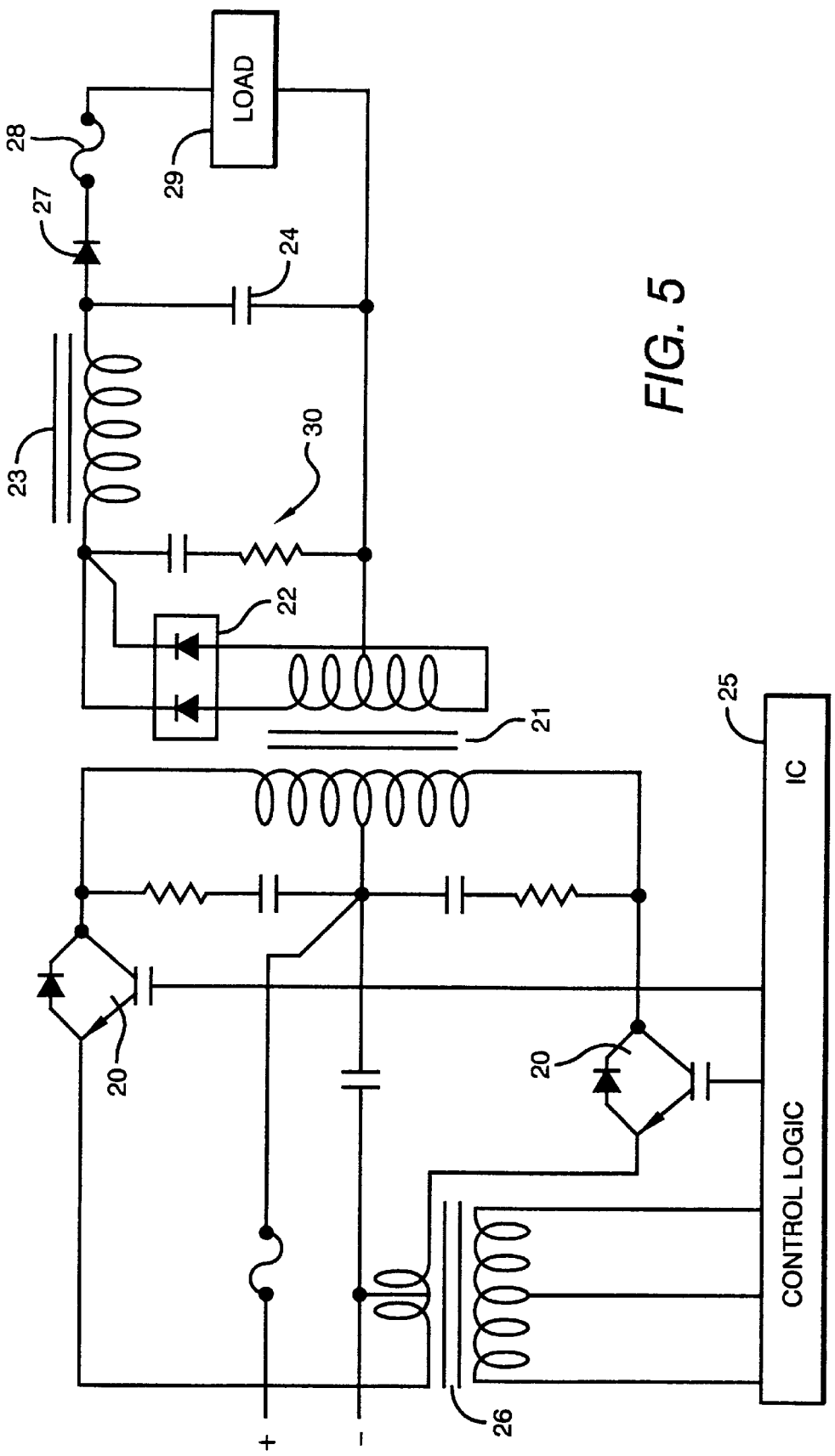
FIG. 5 is a circuit diagram for the forward converter.

FIG. 5 shows the forward converter with integral isolation boundary. This circuit consists of two insulated-gate bipolar transistors (IGBTs) (20) in a push-pull configuration driving a toroidal, three inch diameter ferrite core transformer (21). The secondary of this transformer drives two high speed rectifier diodes (22) in a full wave configuration followed by an output inductor (23) with a toroidal core of powdered iron, and a high-frequency filter capacitor (24).

The first component of this circuit is a pair of Powerex CM50E3Y-24E IGBTs (20) in a push-pull switching configuration. This converts the current back into AC at the higher frequency of 25 KHz, allowing the use of a small, lightweight ferrite core transformer. The transformer core consists of three Phillips 144XT500-3C85 cores stacked to obtain the necessary magnetic path effective cross-sectional area. This core is bifilar wound with two primary windings each consisting of 39 turns of seven twisted insulated 20 gauge copper conductors, connected in series. It is then bifilar wound with two secondary windings, each consisting of 21 turns of seven twisted insulated 20 gauge copper conductors, connected in series. This turns ratio covers output voltages from 72 VDC to 150 VDC. For a higher output voltage range, more secondary turns and fewer primary turns are used.

The IGBTs are controlled by a current mode control scheme which provides constant, balanced primary currents, resulting in dynamic balancing of the magnetic flux in the transformer core (21). Current mode control is accomplished by utilization of a Unitrode UC1846J IC (25) specifically designed for this purpose, and fed by a push-pull current sense transformer (26). This transformer is constructed on a Phillips 266CT125-3B7 0.375 inch diameter ferrite core with a primary consisting of two turns, center-tapped, of 20 gauge copper wire and a secondary consisting of two windings of 67 turns each, bifilar wound and connected in series, of 34 gauge copper wire.

The UC1846J IC (25) drives a pair of Powerex M57959L IGBT driver ICs. These ICs provide the bipolar gate drive necessary for safe operation of the IGBTs at this power level in the forward converter primary circuit. The IGBT drivers contain controlled shut-down fault detection circuitry, to protect the IGBTs under short-circuit load conditions. The IGBT drivers also provide an optical coupling between the controller IC and the IGBTs needed to maintain electrical isolation between these circuits. In this way the power line and control logic quadrants are isolated from each other, as well as from the battery stack, making safe operation "single fault tolerant." In other words, it takes more than a single fault to create a dangerous condition.

U.S. Pat. No. 4,002,963 fully documents and describes the method used to achieve current mode control as implemented in the commercially available IC (25) used in this invention. The disclosure of the 1963 patent is incorporated herein by reference.

The secondary winding of the ferrite core power transformer (21) feeds through a SGS-Thomson STTA 12006-TV2 (ultra-fast dual rectifier diodes) (22) in a full wave configuration, then through the output inductor (23), and high frequency filter capacitor (24), then through a 1N1188 output blocking diode (27) and a Cooper-Bussman SC-50 50 Amp/250 VDC output fuse (28) to the vehicle's battery pack (29).

The output inductor (23) consists of a Micrometals T300-26D three inch, toroidal, powdered iron core wrapped with 39 turns of two sets of conductors, each set composed of seven twisted insulated 20 gauge copper conductors, the sets bifilar wound and connected in parallel. The output capacitor (24) is a low impedance metalized film type, 20 UF/250 VDC.

The charger's programming for battery stack voltage is provided by a precision divider network contained in a plug-in chip carrier with four precision resistors calculated to divide the stack voltage by the number of cells, allowing the temperature compensated voltage threshold detection circuitry to operate at cell voltage in all cases, independent of actual stack voltage. These plug-in precision divider networks are made by Coherent Power and are field changeable in order to accommodate the use of different stack voltages. The charger's programming for battery stack current is provided by field adjustment of up to eleven 15 turn potentiometers in order to accommodate use of batteries with different amp-hour ratings and charging algorithms. Light emitting diodes (LEDs) indicate which adjustment is active, to prevent mistakes while making adjustments. This dual level of programmability was incorporated into the present invention so that two models of the charger will accommodate the entire range of stack voltages from 72 VDC to 350 VDC or more.

Figure 6:
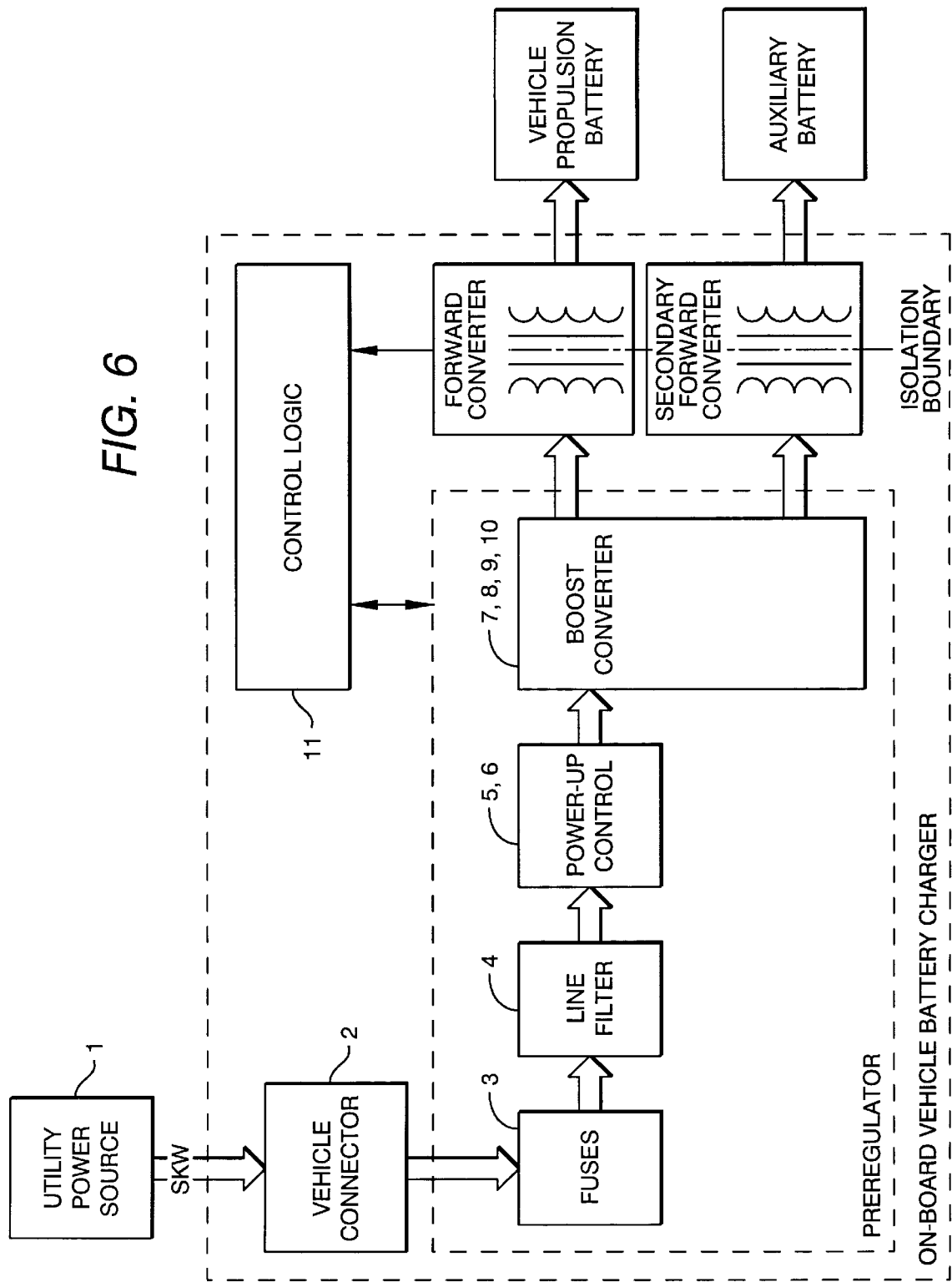
FIG. 6 is a block diagram of the entire on-board charging system including a second forward converter in series with the boost preregulator circuit.

As previously stated, the present invention provides DC to DC conversion with mostly the same components as the charging network to enable the use of the vehicle high-voltage battery stack to power the peripheral electrical systems such as the radio, windows, etc. This integral DC to DC converter function is provided in the present invention by a second forward converter acting in combination with the existing boost preregulator circuit. The second forward converter is a 1 KW version of the forward converter previously described. FIG. 6 illustrates the second forward power converter in series with the boost preregulator circuit and coupled to charge an auxiliary (12 volt) battery.

In order to achieve a high overall efficiency in a charging device with both a boost converter (boost preregulator) and a forward converter operating in series, extremely high efficiencies must be achieved individually in both the boost converter (boost preregulator) and the forward converter. According to the preferred embodiment, individual efficiencies of 95% yield an overall efficiency of 90% (0.95×0.95= 0.9025). This theoretical value has been confirmed by accurate simultaneous measurement of both the input and the output of the charger and between the two converters (the boost preregulator and the forward converter).

Since the typical efficiency of a boost converter (boost preregulator) or forward converter is closer to 85% in practice, achieving 95% efficiency requires that a prime design consideration be the reduction of the impedance of all high frequency paths. All high current high frequency conductors must be comprised of multiple twisted insulated conductors no larger than 20 gauge and all high frequency paths should be as short as physically possible.

The high frequency path length in the boost converter (boost preregulator) is kept exceptionally short by the use of an IGBT with both an internal damper diode with its reverse recovery time and forward current rating matched to the IGBT, and a second internal diode, similarly matched to the IGBT. Since the second diode is not needed as part of a snubber circuit (as in buck and flyback converters), it can be utilized as the boost diode, allowing the high frequency path to be closed at the IGBT terminals by connecting a capacitor of sufficiently low impedance directly at the IGBT terminals. This confines the high frequency path to the bridge rectifier, input inductor, IGBT, and interconnecting wiring. Since a single capacitor with sufficiently high capacitance and low impedance could not be found, a capacitor with the required effective capacitance and effective impedance was created by connecting as many small (1 to 5 UF/630 volt metalized film type) very low impedance type capacitors in parallel as physically possible at the terminals of the IGBT (from the emitter of the IGBT (E) to the cathode of the internal boost diode (K)).

In the forward converter the high frequency path is kept as short as possible by connecting a very low impedance capacitor (1 UF/630 VDC metalized film type) between the center tap of the current sense transformer primary and the center tap of the power transformer primary. This confines the high frequency path to the two IGBTs and the two transformers. A critical damping network connected across each primary winding ensures that the ringing which occurs in the primary circuit after the turn off of each half cycle damps to zero in no more than 60% of the minimum dead time between half cycles. Each damping network is composed of a resistor and capacitor in series. For operation at the 5 KW power level, the optimum values have been found to be 75 ohms/25 watts for the resistors and 3.3 NF/3 KV disc type for the capacitors. Also, a discharge restraint type of snubber circuit is connected across each IGBT. Each circuit consists of the second internal diode in each IGBT, a resistor, and a capacitor. This snubber circuit suppresses the voltage spike that would otherwise be created at each IGBT collector terminal at turn off time. For operation at the 5 KW power level, the optimum values have been found to be 600 ohms/10 watts for the resistors and 3.3 NF/3 KV disc type for the capacitors.

To keep the efficiency of the forward converter high at lower power levels, the output voltage of the boost preregulator is made programmable by switching in a different trim resistor in the voltage loop of the boost controller for each step of the charging algorithm. This is shown in the left half of FIG. 3. The switches are quad bilateral switches type CD4066. This switching permits the output voltage of the preregulator boost circuit, which is also the input voltage of the forward converter primary circuit to be reduced as the power level is reduced, maintaining the duty cycle of the forward converter constant and near maximum at all power levels. This output voltage reduction keeps the efficiency of the forward converter high at all power levels.

Quad bilateral switches are also used to switch between the various current level adjustments as the charge algorithm progresses. All quad bilateral switches are under the control of a proprietary sequential state engine and digital encoder circuit contained in a programmable gate array of EEPROM technology, which feeds a pair of proprietary digital decoder circuits, also contained in programmable gate arrays, which are located, one in the boost circuit to minimize THD at all power levels, and one in the forward converter circuit to step through successive current levels as the algorithm progresses.

In the secondary circuit of the forward converter, equalizing the lengths of the two halves of the full wave rectifier circuit (22) helps preserve the balance dynamically created in the primary circuit by the current mode control scheme previously described. A snubber network (30) consisting of a resistor and a capacitor in series is connected from the junction of the dual diodes (22) and the output inductor (23) to the center tap of the secondary of the power transformer (21) to suppress the spike that would otherwise be generated in the secondary circuit by the ultra fast turn off of the diodes (22). For operation at the 5 KW power level, the optimum values have been found to be 33 ohms/5 watts for the resistor, and 3.3 NF/3 KV disc type for the capacitor. The output blocking diode (27) prevents the output filter capacitor (24) from charging from the battery stack (29) when the charger is connected, preventing a potentially dangerous spark from occurring.

While this invention has been described above in connection with various preferred and alternative embodiments, it is understood that persons of skill in the art can make numerous modifications without departing from the scope of the invention as claimed in the following claims.

We claim:

1. An electric vehicle battery charger for charging a battery stack, comprising:

a connector sized and dimensioned to electrically couple the electric vehicle battery charger to a power source capable of providing power to the charger, the provided power comprising an input voltage and input current;

a boost pre-regulator receiving power from through the connector and having compensation networks which are dynamically adjusted for power level, the pre-regulator providing power factor correction to maintain a power factor of at least 99.9% and a total harmonic distortion of the input current of 2–3% at full power, and less than 5% at all power levels, while the input voltage is anywhere within the range of 95 to 265 VAC; and a forward converter receiving cycle-by-cycle control from a current-mode controller which is in turn under the control of the boost pre-regulator, in order to achieve substantially constant duty cycle of the forward converter over the entire range of power levels.

* * * * *

UNITED STATES PATENT AND TRADEMARK OFFICE
CERTIFICATE OF CORRECTION

PATENT NO.   : 6,087,802
DATED        : July 11, 2000
INVENTOR(S)  : Ellen James It is certified that error appears in the above-identified patent and that said Letters Patent is hereby corrected as shown below:

<u>Column 1,</u>
Line 3, please add the following to the front of the first paragraph:
-- This is a divisional of U.S. Application No. 08/518638, filed August 24, 1995, (U.S. Patent No. 6,087,802) --

Signed and Sealed this

Twelfth Day of August, 2003

JAMES E. ROGAN
*Director of the United States Patent and Trademark Office*